A. B. DAY.
MINING CAR WHEEL.
APPLICATION FILED MAY 25, 1920.
1,364,616.
Patented Jan. 4, 1921.
2 SHEETS—SHEET 1.
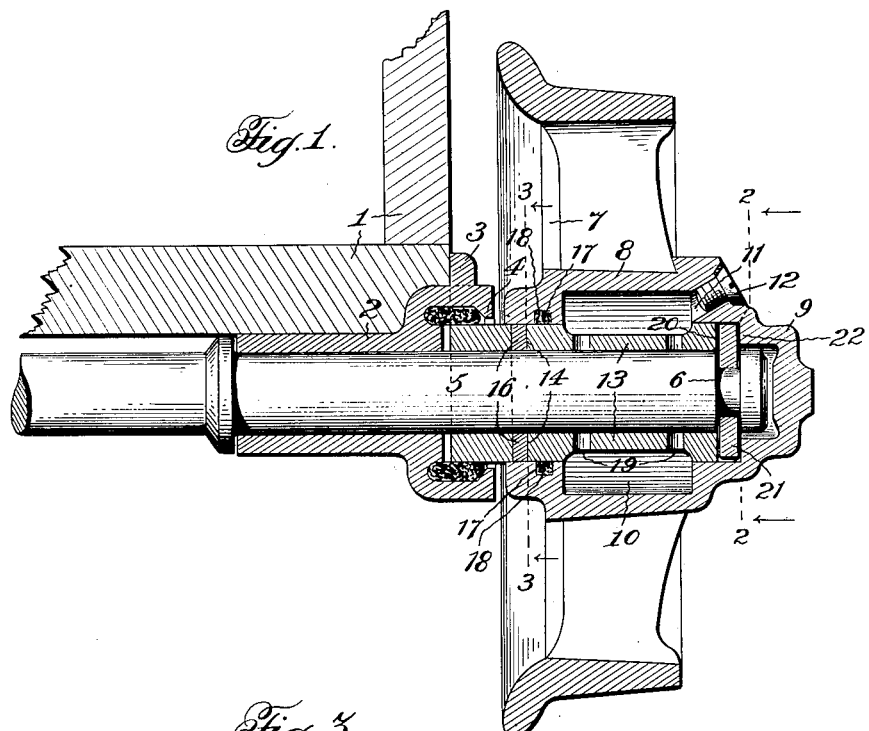
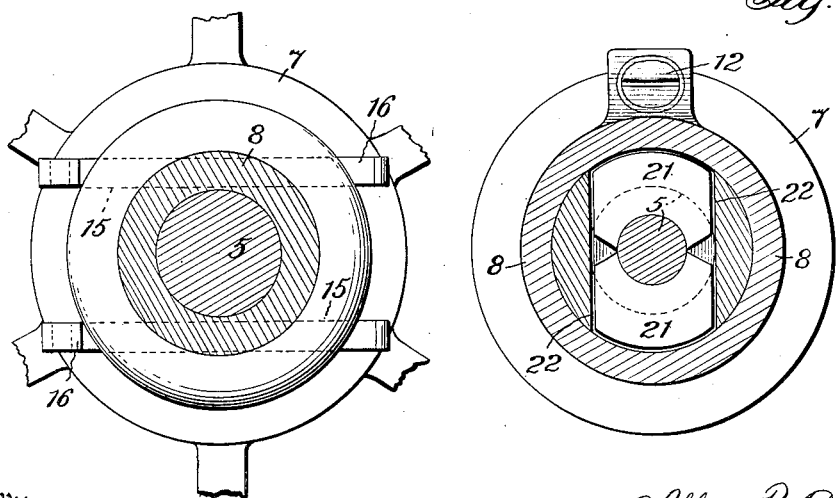
Witness:
Jas. E. Hutchinson
Inventor:
Alfred B. Day,
By
Milans & Milans,
Attorneys

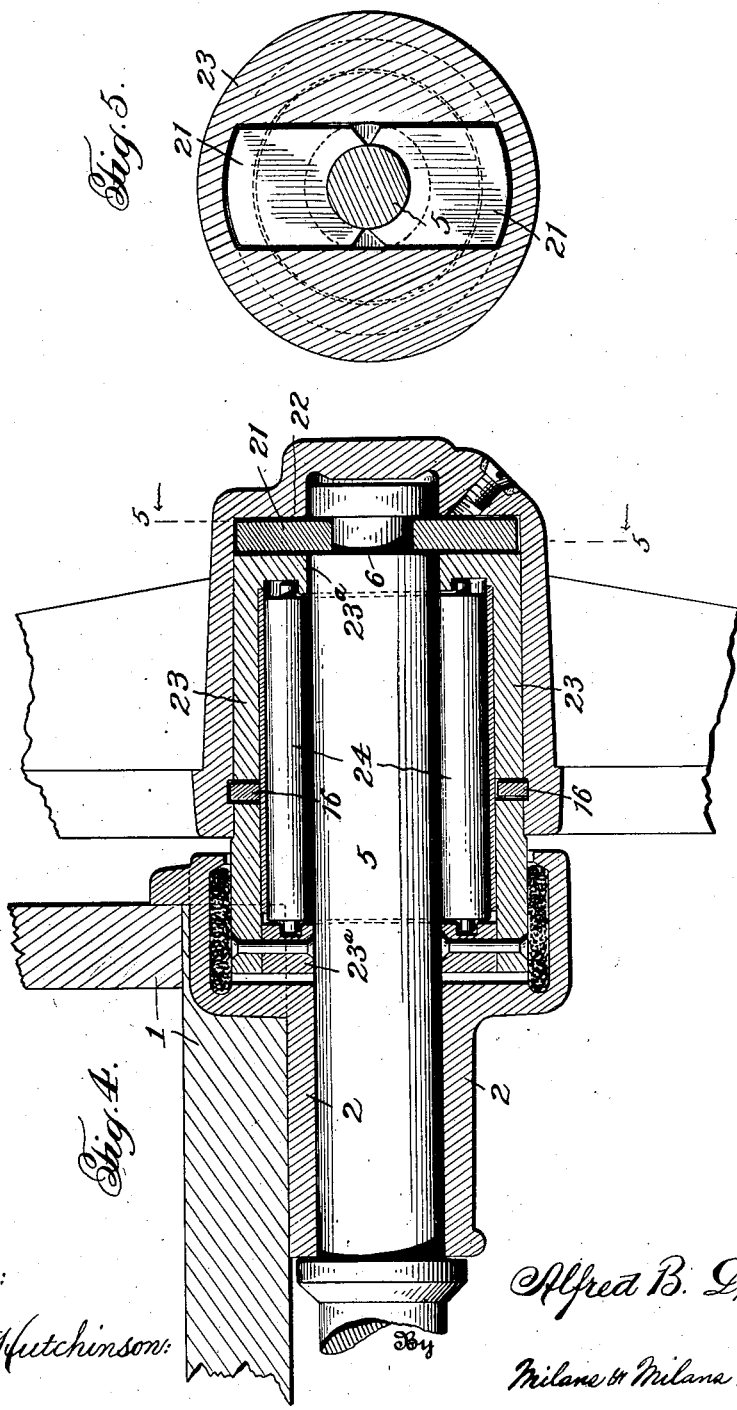

UNITED STATES PATENT OFFICE.

ALFRED BRYANT DAY, OF OLIVER SPRINGS, TENNESSEE.

MINING-CAR WHEEL.

1,364,616.

Specification of Letters Patent.

Patented Jan. 4, 1921.

Application filed May 25, 1920. Serial No. 384,226.

*To all whom it may concern:*

Be it known that I, ALFRED B. DAY, a citizen of the United States, residing at Oliver Springs, in the county of Roane and State of Tennessee, have invented certain new and useful Improvements in Mining-Car Wheels, of which the following is a specification, reference being had therein to the accompanying drawing.

This invention relates to improvements in mining car wheels, and more particularly to wheels of the general character illustrated and described in my Patents, Numbers 1,326,255 and 1,326,649, dated December 30, 1919, wherein there is disclosed, among other features, novel and improved locking means interposed between the hub and the axle to limit relative lengthwise movement, while permitting of free rotatable movement of the hub on the axle.

In the construction of the patents above referred to, a bushing was interposed between the hub and axle, and the locking means between the hub and axle took the form of a key adapted to be fitted to a recessed part adjacent the closed end of the hub, whereby to be fixed against relative rotatable movement with respect to the hub and designed to engage a peripheral groove of the axle, said key also forming an abutment for the end of the bushing which terminated at said grooved portion of the axle.

In the present embodiment of my invention, it is contemplated to provide a key-receiving recess or recesses in the end of the bushing, itself, thereby doing away with the necessity of forming a recess in the hub proper for the reception and retention of the key, thereby simplifying the machine work incident to the formation of the bore of the hub.

It has been ascertained that key-retaining means arranged and constructed in the manner just described simplifies the construction materially, reduces the cost of production, and a novel and efficient construction of wheel and associated locking means results.

It is further contemplated by the invention to provide a plurality of coöperating retaining means interposed between the axle and the hub of the wheel, to the end that a substantially continuous retaining ring or locking means surrounding the axle is provided, thereby more evenly distributing the wear, and balancing the parts, and to accomplish this in a manner not necessitating the formation of openings through the sides of the hub for the insertion and removal of the key; the locking means, as in the previous patents above noted, being internal with respect to the hub and adapted to be assembled and removed upon the removal of the hub from the bushing and axle, and the construction and arrangement requiring no further means such as screws, bolts, or the like, to secure it in place.

Other improvements and novel details in the construction and arrangement of the parts of the present invention will be appreciated from the description to follow, which for a clear understanding thereof is to be considered in connection with the accompanying drawings, which constitute a part hereof and wherein is disclosed, for the purpose of illustration, a convenient and satisfactory embodiment of the invention, though it is to be borne in mind that minor changes in details may be resorted to without departing from the spirit of the invention.

In the drawings, Figure 1 is a sectional view of the interior construction of the wheel and associated parts, certain parts, including the axle, being shown in elevation;

Fig. 2 is a transverse section substantially on the line 2—2 of Fig. 1, and looking in the direction of the arrows;

Fig. 3 is a detail longitudinal section of a modified construction, with parts broken away;

Fig. 4 is a longitudinal section of a slightly modified form of construction; and Fig. 5 is a transverse section of the same, substantially on the line 5—5 of Fig. 4.

With more particular reference to the drawings, in which like reference numerals refer to corresponding parts throughout the several views, 1 is a diagrammatic illustration of the car framework, broken away, the same having mounted thereon in any convenient manner, a suitable pedestal box 2, the off-set enlarged ring portion or flange 3 terminating in an inwardly projecting flanged part 4. 5 is an axle projecting through the pedestal member 2 and extending a considerable distance outwardly therefrom, the said axle having adjacent its outer terminal a peripheral groove 6 constituting a key-engaging recess.

The wheel conveniently comprises a body portion 7 having connected thereto a hub part 8 which latter has a closed cap 9 preferably integral with the hub. The hub is conveniently hollow whereby to form an annular oil reservoir 10 which connects with an inclined oil feed passage way 11 projecting through the end of the hub at a point adjacent the connection of the hub with the spokes of the wheel. The oil passage way 11 is adapted to be normally closed as by means of a threaded closure plug 12, which of course is removable at will. Interposed between the hub of the wheel and the axle is a suitable bushing 13 which may be in a plurality of sections, but which preferably is in the form of a continuous unbroken cylinder, and this bushing may be formed of different metal, such as relatively hardened metal, with respect to the hub of the wheel. This bushing projects inwardly a considerable distance beyond the inner end of the hub, and into the space formed by the enlarged portion 2 of the pedestal and the axle, the inner end of the bushing terminating at a point adjacent to but slightly spaced from the adjacent face of the pedestal wall. The bushing substantially fills the space between the ends of the hub and the axle, as illustrated, and the inner end of the hub of the wheel conveniently projects inwardly beyond the inner face of the wheel parts and terminates at a point adjacent, but slightly spaced from the adjacent edge of the flanged portion 4 of the pedestal member. It will be seen that the inner end of the hub provides an extended supporting surface for the bushing at this point. The bushing is preferably secured to the hub of the wheel as by transverse recesses through the hub, arranged at opposite sides of the axle, which said recesses designated by the the numeral 14 are adapted to register with openings 15 in the surrounding hub, removable retaining bolts 16 being provided which project through said registering openings or recesses in the bushing and wheel hub. These retaining bolts may be of any desirable construction, but preferably are of the square or flat key type, as illustrated. The hub at a point between the retaining bolts 16 and the oil reservoir 10 is provided with an annular packing chamber 17 adapted to receive a ring of packing, such as felt 18, the packing being adapted to rest upon the outer periphery of the bushing.

The bushing preferably constitutes the inner wall of the oil chamber 10 of the hub, and said bushing is provided with openings 19 adjacent opposite ends of the oil reservoir whereby to establish direct communication between said reservoir and the periphery of the axle. The outer end of the bushing is provided with a key-receiving recess 20, conveniently projecting transversely entirely thereacross whereby to receive a pair of coöperating oppositely disposed key blocks 21, the inner edges of which are shaped to conform to the base of the groove 6 of the axle, whereas the outer edges thereof are shaped to conform to the periphery of the bushing, and, when in place with respect to the bushing, are arranged within the confines of the bushing and constitute in effect parts of the latter substantially filling the space 20, though of course sufficient space is provided to permit of ready assembly and removal. The coöperating key blocks, it will be observed, constitute a substantially continuous bearing extending entirely around the groove 6 of the axle, and in view of the fact that these key blocks are positioned within grooves of the bushing, it is necessary to provide key-receiving grooves in the hub, and as a matter of fact the bore of the hub of the wheel for the reception of the bushing may be of the same diameter throughout, which facilitates the machine work. The cap end of the hub is of course hollow, whereby to receive the projecting end of the axle, and this hollow space of the hub is of reduced diameter with respect to that of the bushing-receiving space of the hub, thereby providing a shoulder or abutment 22 for the outer end of the bushing and outer face of the key of the blocks positioned in the bushing. As it becomes desirable to remove or assemble a wheel of the improved type herein contemplated, it is only necessary to remove the retaining bolts 16, whereby the wheel may be slid over the bushing into or out of position. When removed from the bushing and axle, the locking keys 21 may be readily positioned on the axle in engagement with the recessed terminals of the bushing, and by removing the keys 21, the bushing itself may be removed from the axle.

In the modified construction illustrated in Fig. 3, the parts corresponding with the same parts of Figs. 1 and 2 are given the same reference numeral with an alphabetical exponent. In this view, however, the bushing, which is given the numeral 23, in addition to constituting the functions of a bushing, has off-set ends 23ª forming retaining flanges for pintles projecting from the end of roller bearings 24 which in this embodiment of the invention are interposed between the body portion of the bushing and the axle. One of the flanges, or off-set ends 23ª, may be and preferably is removable to facilitate the positioning and removal of the rollers, and these flanges are of a construction whereby to retain the rollers in place in the bushing, upon the removal of the bushing from the axle.

What I claim as new and desire to secure by Letters Patent of the United States, is:

1. In a mining car wheel, the combination of a hub part adapted to be sleeved over the end of an axle, a portion of the diameter of the bore of the hub being greater than the diameter of the axle, whereby to provide a bushing space between the hub and axle, a bushing in said space, said bushing having a locking key recess in its outer end, which said end terminates at a point inwardly from the end of the axle, and a locking key adapted to be positioned in said recess and projecting beyond the inner surface of the bushing whereby to engage a peripheral groove of the axle.

2. In a mining car wheel, the combination of a hub part adapted to be sleeved over the end of an axle, a portion of the diameter of the bore of the hub being greater than the diameter of the axle, whereby to provide a bushing space between the hub and axle, a bushing in said space, said bushing having a terminal locking key recess, a locking key adapted to be positioned in said recess and projecting beyond the inner surface of the bushing whereby to engage a peripheral groove of the axle, and locking means interposed between the bushing and hub.

3. In a mining car wheel, the combination of a hub part adapted to be sleeved over the end of an axle, a portion of the diameter of the bore of the hub being greater than the diameter of the axle, whereby to provide a bushing space between the hub and axle, a bushing in said space, said bushing having a locking key recess in its outer end, a locking key adapted to be positioned in said recess and projecting beyond the inner surface of the bushing whereby to engage a peripheral groove of the axle, said outer end of the bushing terminating at a point opposite said groove, a locking key projecting through the hub and bushing, the said hub having a packing space in communication with the bushing at a point disposed inwardly beyond the last-mentioned locking key, and a packing such as felt in said packing space.

4. A mining car wheel, having a hollow hub adapted to be sleeved over the end of an axle having a peripheral groove adjacent its end, a bushing interposed between the hollow hub and axle, locking means interposed between the hub and bushing, and a key to engage the peripheral groove of the axle, the said bushing having a terminal retaining recess for said key.

5. A wheel construction adapted to be sleeved over the end of an axle with a peripheral groove, including a hub part, a bushing interposed between the hub and axle, means of connection between the bushing and hub, said bushing having a transverse key-receiving recess at the outer edge thereof, and a key adapted to be positioned in said recess and to engage the peripheral groove of the axle.

6. In a wheel construction, the combination of a hub part adapted to be sleeved over the end of an axle having a peripheral groove, a bushing interposed between the hub and axle, oppositely disposed locking keys to engage the peripheral groove of the axle, and coöperating surfaces comprised by the bushing and end of the axle for retaining the locking keys in position against relative rotatable movement with respect to the bushing and hub.

7. In a mining car wheel, the combination of a hub part having a closed end to engage over the end of an axle, which said axle has a peripheral groove adjacent its outer end, the said hub having an axle-receiving chamber connecting with an enlarged bushing-receiving chamber by an annular shoulder part forming an abutment, a bushing interposed between the hub and axle and terminating at a point adjacent said abutment, said bushing having a recess in registration with said peripheral groove of the axle, and one or more locking keys in said recess to engage the grooved portion of the axle.

8. A wheel comprising a body part, a hollow hub part adapted to be sleeved over the end of an axle having a peripheral groove, a bushing interposed between the hub and said axle and overlying said groove, and opposed coöperating and locking keys projecting through the bushing at the outer edge thereof to engage the groove on the axle, said bushing and locking keys being insertible and removable from the end of the hub, and the hub and bushing coöperating to constitute with the groove of the axle the only retaining means for said keys.

9. A wheel construction comprising a body part and a hub with a closed cap part, the hub being hollow whereby to be positioned over the end of an axle having therein a peripheral groove, a bushing interposed between the hub and axle, the said hub having an annular oil reservoir, and a normally closed inlet communicating with the side of the wheel, and the outer periphery of the bushing constituting the inner periphery of the oil reservoir, said bushing having openings establishing communication between the oil reservoir and axle, and said bushing also having key-ways therethrough at its end in registration with the groove of the axle, and locking keys arranged in said key-ways to engage said groove in the axle, said keys being insertible and removable from the inner end of the hub.

10. A wheel construction comprising a tubular pedestal member having an enlarged annular part, a wheel having a body part and a hub, the inner end of the hub projecting inwardly beyond the inner face of the wheel to a point adjacent the enlarged part of the pedestal, an axle having a peripheral groove, a bushing interposed between the wheel hub and axle and projecting inwardly to a point within the enlarged part of the pedestal, locking means interposed between the bushing and wheel hub, and locking means projecting through the bushing and engaging the peripheral groove of the axle, said locking means being held in place by the adjacent walls of the hub and bushing.

11. A wheel construction comprising a body part and a hub part having a closed end, the hub being adapted to be sleeved over the end of an axle with a peripheral groove, a bushing interposed between the hub and axle and having a locking key recess in the terminal thereof adjacent the closed end of the hub, a locking key in said recess to engage the groove of the axle, and roller bearings interposed between the bushing and axle.

12. In a mining car wheel adapted to be sleeved over the end of an axle having a peripheral groove adjacent its end, the combination of a hub part for the wheel, having a closed end adapted to project over the end of the axle and having a shoulder part spaced inwardly from the end of the axle, in substantial alinement with the outer edge of the groove of the axle, a bushing positioned within the hub and sleeved upon the axle, said bushing terminating at said shouldered portion of the hub and having in its terminal transversely-extending key recesses, and opposed locking keys positioned in said recesses engaging the peripheral groove of the axle.

In testimony whereof I hereunto affix my signature in the presence of two witnesses.

ALFRED BRYANT DAY.

Witnesses:
H. J. PEIPER,
C. N. EAGERTON.